Figure 1:
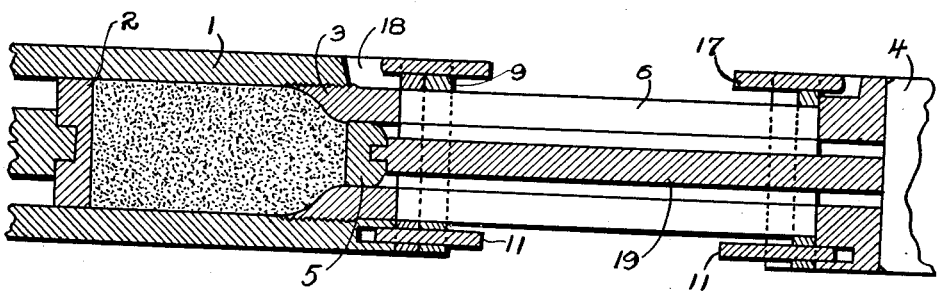

J. W. BROWN.
METHOD OF FORMING BODIES FROM PLASTIC MATERIAL.
APPLICATION FILED FEB. 23, 1912.

1,183,427.

Patented May 16, 1916.
3 SHEETS—SHEET 1.

WITNESSES
T. F. Helms
H. G. Grover

INVENTOR
JOHN W. BROWN
BY Ira J. Adams.
ATTORNEY

J. W. BROWN.
METHOD OF FORMING BODIES FROM PLASTIC MATERIAL.
APPLICATION FILED FEB. 23, 1912.

1,183,427.

Patented May 16, 1916.
3 SHEETS—SHEET 2.

WITNESSES

INVENTOR
JOHN W. BROWN
BY
ATTORNEY

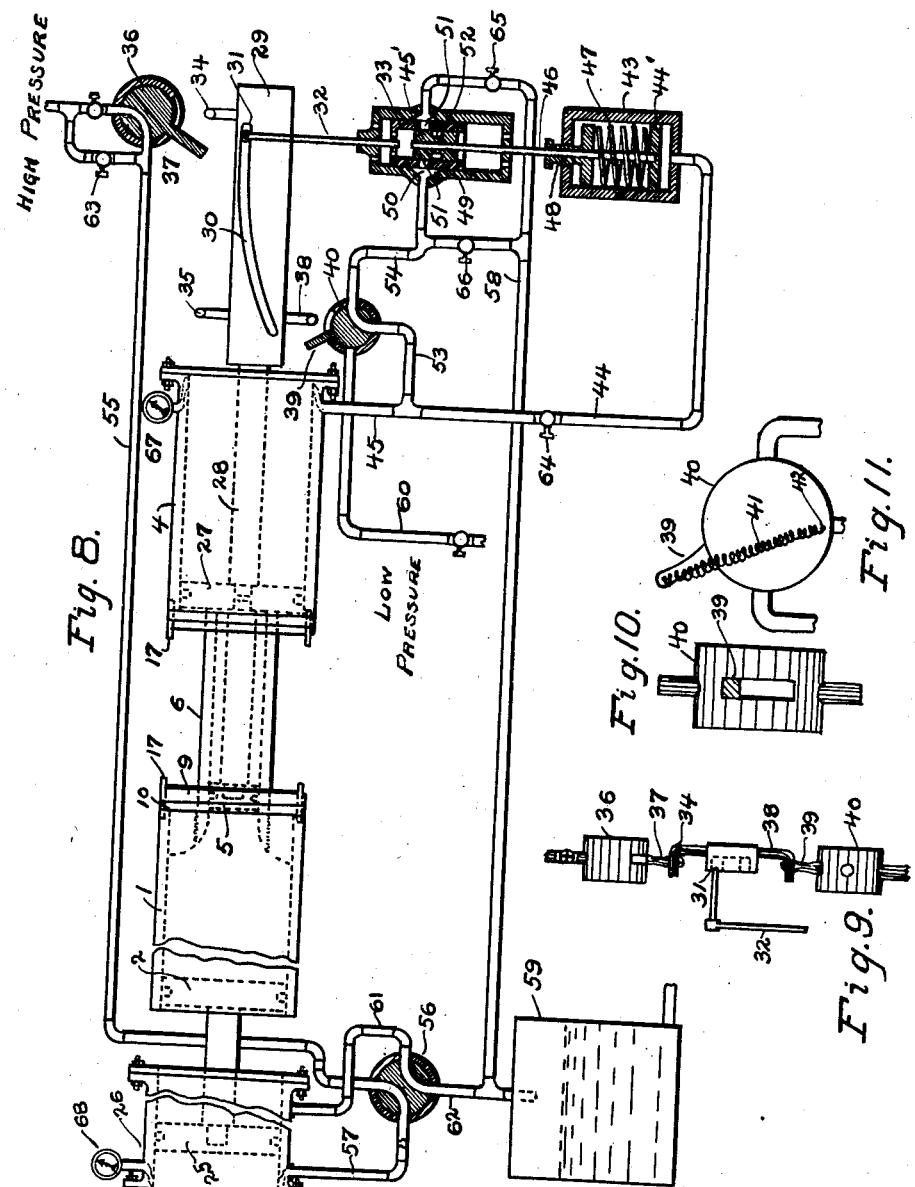

UNITED STATES PATENT OFFICE.

JOHN W. BROWN, OF LAKEWOOD, OHIO, ASSIGNOR TO NATIONAL CARBON CO., OF CLEVELAND, OHIO, A CORPORATION OF NEW JERSEY.

METHOD OF FORMING BODIES FROM PLASTIC MATERIAL.

1,183,427.   Specification of Letters Patent.   Patented May 16, 1916.

Application filed February 23, 1912. Serial No. 679,306.

*To all whom it may concern:*

Be it known that I, JOHN W. BROWN, a resident of Lakewood, in the county of Cuyahoga, in the State of Ohio, have invented new and useful Improvements in Methods of Forming Bodies from Plastic Material, of which the following is a clear and exact description.

My invention relates to means and method of forming bodies from plastic material.

The invention may be used in forming molded electrodes or in forming bodies from any material whatever that may be compressed into one adherent mass.

The object of my invention is to form large bodies from plastic material so that the resultant product is of uniform density and free from cores and cracks.

In molding small bodies from carbon mixtures or any other material it is the usual practice to force the plastic material or "mud", as it is called, through a small die the size and shape of the body to be formed. The pressure of the piston in the large mud cylinder forces the material out through the die, and since this die is small the material forced through it is substantially equally impeded in its travel. The small body is therefore subjected to substantially uniform pressure in the die and is substantially of equal density throughout its cross section. It might appear at first thought that large bodies could be molded by increasing the size of the outer cylinder and the size of the die in proportion to the size of the body to be formed. This, however, cannot be done for the following reasons: When the size of the die is increased, the friction of the sides of the die may impede the progress of the plastic material sufficiently to compress the outer portions of the electrode or other body to the desired density. The inner portions of the large electrode or body are not greatly impeded by the friction against the die, and the material is forced through the central part of the die at a greater rate and at a lower compression than the outside portions. Since there is very little resistance to the flow of the material through the center of the die, the central portion of the electrode or body will be hardly compressed at all, and as it will travel faster than the outside portions, there will be a sort of core formed with occasional crevices extending to the outer surfaces. Experience has thus proven that large bodies of certain plastic material can not be forced through dies and be compressed into a uniform density, although small ones can be so forced successfully. The size of the body that can be satisfactorily made by forcing the mix through a die by the known processes, of course, depends upon the plasticity of the material. While bodies could be successfully forced through dies below a certain diameter from a mix of certain plasticity, it would not be satisfactory to force them through dies of so large a diameter if the mix were of a higher plasticity. There is therefore a limiting size for each mix depending upon the character of the mix and the plasticity.

One of the known ways of forming large bodies of plastic material that are required to be of uniform density is to tamp the material in the mold so that all the parts of the body are equally tamped and compressed. This is a slow process and the results obtained are not entirely satisfactory. One inherent defect of a tamped electrode is that surfaces are formed in tamping. When the first batch of mix is put into the mold and tamped, a surface is formed that does not always perfectly unite with the next batch that is tamped on top of the first. The second tamping will of course form another surface that may unite imperfectly with the third. Thus the tamped electrode is liable to be formed of a series of imperfectly united sections. My invention aims to do away with this slow and unsatisfactory process, and to admit of quick molding of large bodies from plastic material.

Figure 2:
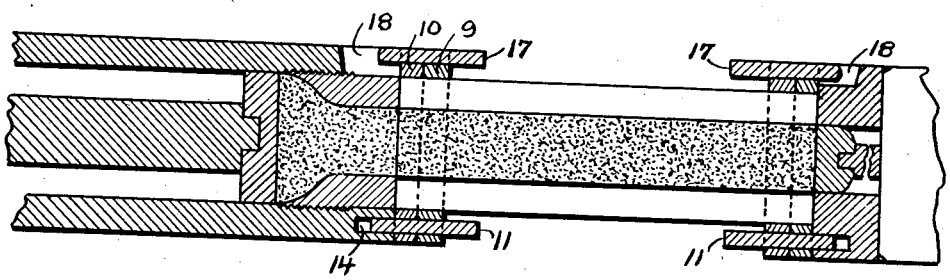
Figure 4:
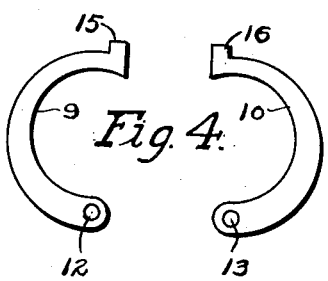
Figure 3:
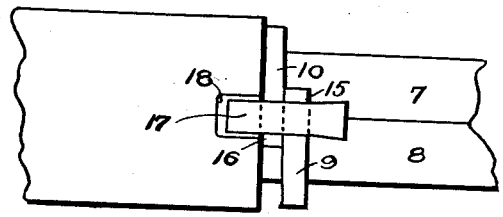
Figure 5:
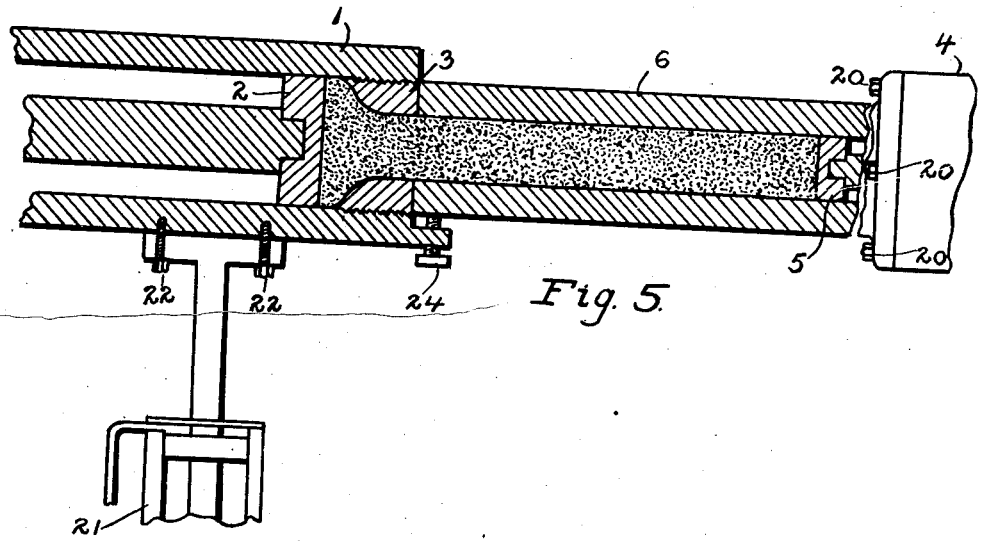
Figure 6:
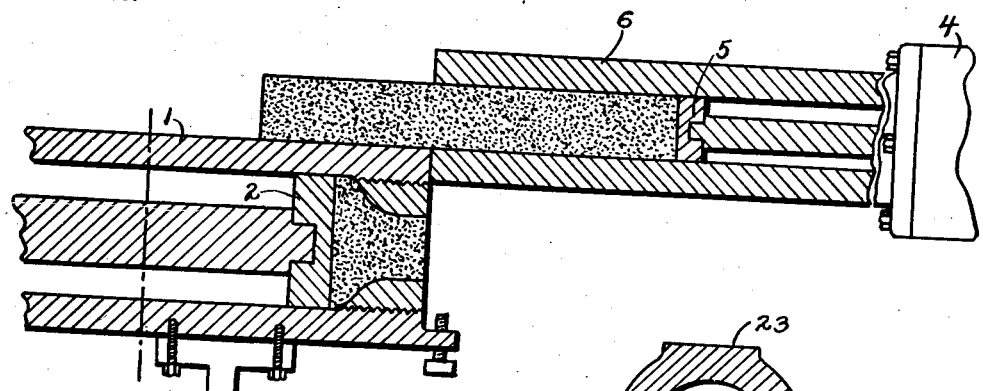

In the drawings: Figure 1 indicates a section of one form of apparatus for performing the method. Fig. 2 is a section of the same apparatus with the working parts in a different position. Fig. 3 is a top view of the apparatus showing the means for locking the two parts of the "mud" cylinder together. Fig. 4 is a detail view of the locking members. Fig. 5 is a section of another modification. Fig. 6 is a section of the apparatus shown in Fig. 5 with the working parts in a different position. Fig.

7 is a section of one hydraulic cylinder shown in Fig. 6. Fig. 8 is a semi-diagrammatic view of a working system embodying my invention. Fig. 9 is a detail of the valve tripping mechanism. Fig. 10 is a detail of the valve structure. Fig. 11 is another view of the valve shown in Fig. 10.

Referring to Fig. 1, 1 indicates a "mud" cylinder containing the material to be pressed into the desired shape. Inside the cylinder is a ram or piston 2 that is subjected to any force, preferably hydraulic pressure. A die 3 is screwed into or otherwise fastened in the head of the cylinder 1. This die has an opening therein of the desired shape and size. A second hydraulic device is placed on the right, the cylinder of which is indicated by 4. A piston or ram 5 is forced to the left by the hydraulic pressure in the cylinder 4. Between the cylinders 1 and 4 is placed a cylindrical mold 6 formed of two semi-cylindrical parts 7 and 8 shown in Fig. 3. This cylinder fits securely in between the two cylinders and has an opening throughout its central portion conforming to the shape of the body to be molded. The two parts of the mold 6 and 7 are locked together by a clamp composed of two parts 9 and 10 shown in Fig. 4. The two clamps are placed around the mold in correct position between the two cylinders; the pin 11 is then inserted through the holes 12 and 13 in the two parts of the clamp and in an opening 14 in the cylinder 1. The part 9 of the clamp has a projection or lug 15 and the part 10 has a projection or lug 16. A key or pin 17 is then forced in between the two lugs 15 and 16, and into a slot or opening 18 in the upper part of the cylinder 1. The key 17 has slanting surfaces so that by driving it in between the lugs the two parts of the cylinder can be firmly clamped together. The clamp that fastens the right hand end of the mold sections together is exactly similar to the clamps on the left hand end, and they need not be further described. The piston head 5 is screwed or otherwise fastened to the piston rod 19 so that it can be readily removed to permit another piston head of different size to be inserted on the piston rod so that different sizes of molds can be used.

The operation of the apparatus disclosed briefly described is as follows: The material is placed inside the cylinder 1. The piston rod 5 is then in the position shown in Fig. 1. A high pressure is then applied to the piston head 2 and a lower pressure to the piston head 5. The piston head 2 will advance inside the mud cylinder, and compress the material therein. When it is compressed sufficiently to exert a force on the piston head 5 that is greater than the pressure applied thereto through the rod 19, it will recede toward the right. The advancing piston head 2 will thus force the material through the die 3 and into the mold 6. The friction of the die against the material passing therethrough furnishes a resistance to enable the outside portion of the molded body to be compacted densely. The material cannot flow through the central portion of the die faster than that which flows through the outside portions and its progress is impeded to the same extent as the outside portions. The result is that the entire mass is uniformly compressed and is free from cores and crevices. When the piston head 5 is forced back into the position shown in Fig. 2 the pressure is removed from both sides of the apparatus. The clamps at each end of the mold are then removed and the two parts of the mold are separated leaving the compressed body ready to be taken away. The mold is then clamped together again into position and the operation repeated.

Figure 7:
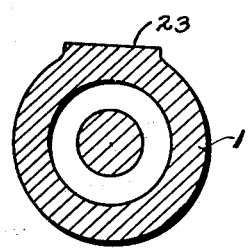

Referring to Figs. 5 and 6, a slightly different modification is shown. The mold in this modification is not separable and is composed of one solid piece. It can be held or fastened in place by any means, but I have shown it fastened to the cylinder 4 by means of screws 20. In order to permit the removal of the compressed electrode in this modification, cylinder 1 is arranged to be lowered and raised by hand or by any means, but I have shown it connected to a hydraulic device 21 having a piston fastened to the cylinder 1 by means of screws 22 or by any other means. The cylinder 1 preferably has a flat upper portion 23 shown in Fig. 7. This is to receive the compressed body when it is forced out by the piston 5. In order to permit the cylinder 1 to be raised to the exact height, a set screw 24 is shown. The stop is shown adjustable since it is desirable to use different sized molds for forming the compressed body. It is immaterial whether the cylinder 1 is lowered while the mold 6 and cylinder 4 remain stationary, or the latter two raised while the former remains stationary; as a matter of practice this would partly depend upon the relative weights. If the cylinder 1 were lighter than the combined weights of the mold 6 and cylinder 4, then the arrangement shown would be followed. If the cylinder 1 were heavier, then it would be preferable to move the other two members instead.

The figures previously mentioned show the details of the mold and mud cylinder. Fig. 8 shows the mold and mud cylinder properly connected and arranged to show how my invention can be used in practice. The parts in this figure that are similar to those in the previous figures are designated by similar reference characters and therefore the specific details of the construction previously referred to need not be again mentioned in connection with this figure. The piston head or ram 2 is connected up to a piston head 25 in the hydraulic cylinder 26. The piston head or ram 5 is connected to a piston head 27 in the hydraulic cylinder 4. The tail-rod 28 is connected to the piston head 27 and extends through the end of the cylinder 4 and is connected to a cam plate 29. This plate has a cam groove 30 therein in which fits a roller 31 or other arrangement connected to a rod 32 which is fastened to the valve sleeve 33. The plate 29 has two upper trip members 34, 35 for engaging the movable part of the high pressure valve 36. The trip 34 engages the arm 37 of the valve in the limit of travel toward the left and admits the high pressure to the hydraulic cylinder 26. The trip 35 engages the arm 37 at the limit of travel toward the right and closes the valve. The single trip 38 is fastened to the lower part of the plate 29 in position to engage the arm 39 of the low pressure valve 40 when the trip has reached the limit of travel toward the left. The construction of the trip members and their relation to the plate 29 and arms of the valves 36 and 40 are shown in Fig. 9. The details of the valve 40 are shown in Figs. 10 and 11. The spring 41 is fastened to one end of the arm 39 and at the other end to the valve casing at 42. It will thus be seen that when the valve arm is moved past the central position the spring will snap it quickly forward in the same direction giving a quick opening and closing of the valve. The valve 36 has a similar spring to act in the same way. A pressure controlled device 43 is connected through pipes 44 and 45 to the rear end of the hydraulic cylinder 4. This pressure controlled device contains the piston head 44' connected to the cylinder valve 45 by means of rod 46. The pressure in cylinder 4 is transmitted through the pipes, tends to force the piston head 44' and valve 45 in an upward direction as shown in Fig. 8, while the spring 47 tends to force the same members in a downward direction in this figure. The tension of the spring 47 is controlled by means of the member 48 which can be screwed either downward or upward by means of an appropriate tool. The valve casing 49 surrounds the sleeve 33 which in turn surrounds the piston valve 45'. The movable parts of this valve, of course, are appropriately fitted so as to admit of ready movement without allowing water or other fluid to escape except through the valve openings. The valves and pressure devices will be constructed in accordance with well known mechanical principles. Extending circumferentially around inside of the valve casing 49 is a chamber or groove 50. The valve sleeve 33 has a plurality of openings or holes 51 in its central part. The piston valve 45 has a circular groove 52 extending around it in the central portion. A pipe 53 connects the pipe 45 with the valve 40. The pipe 54 connects the valve 40 with the valve 49.

The operation of the apparatus illustrated in Fig. 8 is as follows: The mold 6 is fastened in place as shown in Fig. 8 and the trip 34 at the limit of travel to the left has forced the arm 37 past the central point so that the spring (not shown) has snapped it to the open position. The trip 38 has likewise, in coöperation with the spring 41 thrown the valve 40 to the position shown in Fig. 8. The high pressure now flows through the valve 36, pipe 55, valve 56, pipe 57 to the hydraulic cylinder 26. The piston 25 is forced forward compressing the mix in the mud cylinder 1, and forcing it through the die into the mold 6. By referring to Fig. 8 it will be seen that the water or other fluid behind the piston 27 cannot escape with the valves in the position shown. The pressure in the cylinder 4 will therefore quickly rise to the point where the piston 44' in the pressure control device will force the piston 44' and the valve 45' upward until the circular groove 52 would be adjacent the openings 51 in the sleeve 33. The water will then be forced through pipes 45, 53, 54, chamber 50, openings 51, groove 52 to the pipe 58 and finally to the waste tank 59. The mix will therefore be forced into the mold 6 against the pressure of the piston head or ram 5. The pressure device 43 will move to such a position to hold the pressure inside the cylinder 4 at a constant value which would be of some value lower than the pressure in the cylinder 26. If the pressure in cylinder 4 tends to increase, the opening from the holes 51 into the groove 52 will be made larger and the pressure will drop down. If the pressure in the cylinder 4 tends to fall off, the piston valve 45 will move downward to decrease the size of the opening so that the pressure will rise. It will thus be seen that the pressure device will maintain a constant value of pressure in the cylinder 4, if the sleeve 33 were held stationary. The value of this pressure will, of course, depend upon the adjustment of the spring 47. By screwing the member 48 downward as shown in Fig. 8 the tension of the spring 47 would be less, and a lower pressure would be maintained in the cylinder 4.

Since the friction of the mix against the mold constantly increases as it is forced therein, it will be of advantage to decrease the counter pressure of the ram 5. The counter or resisting pressure is made up by the three forces: namely, the friction resistance force of the die, the resistance force of the mold 6 and the counter pressure of ram 5. The resistance force of the die may be assumed to be constant irrespective of the position of the ram 5. The resistance force of the mold will increase as explained previously. It is therefore apparent that if the mix is to be forced into the mold at constant compression, it will be necessary to decrease the counter pressure of the ram 5, in the same ratio as the friction force of the mold increases. The mix will thus be forced against a substantially constant pressure. This is done by means of the cam groove 30 acting upon the rod 32. As the ram 5 is forced toward the right the groove 30 causes the rod 32 and sleeve 33 to move in a downward direction as shown in Fig. 8. The openings 51 are therefore caused to approach the groove so that the opening that the water is forced through is made larger. The pressure maintained in the cylinder 4 is thus gradually lowered by the valve 32 which is continually forced downward as the ram 5 retreats. The rate at which the pressure is decreased in cylinder 4 depends upon the shape of the groove 30. This groove may be a straight or curved one depending upon actual experiment. This groove can be made in any shape desired so that any pressure necessary can be maintained in the cylinder. The groove can be shaped so that the pressure can fall off, remain constant for a certain travel of the ram head, or even increase in any desired way. When the mix is forced into the mold 6 far enough to force the ram 5 out of the mold, the trip 35 is pushed and the valve arm 37 passes the center position, so that the spring is snapped, the valve 36 is moved into the closed position. The high pressure is thus cut off from the cylinder 26 and the ram 2 stops. The clamps are then removed from the mold and the compressed body taken out. After the mold and clamps are replaced in the proper position the operator then manually throws the valve 39 to the right. Low pressure then enters the pipe 60 and flows through the valve 40, pipes 53 and 45 into the cylinder 4. The pressure now exerted on the piston 44', even though it would be sufficient to move the piston valve 45' opposite the openings 50, would have no effect since the valve has cut off the pipe 54 from its former connections. When the ram 5 has been forced to the extreme position as shown in Fig. 8, the trip 34 throws the valve arm 37 to admit high pressure to the cylinder 26, and the trip 38 simultaneously throws the valve arm 39 to the left to cut off the admission of low pressure from pipe 60 and opens up connection between the cylinder 4 and the automatic valve 49. The cycle is thus completed and the operation is repeated.

When the mix has been substantially all forced out of the mud cylinder 1, the valve 56 is reversed so that the high pressure from pipe 55 is admitted to the other side of piston 25 through pipe 61, and the piston rod 25 is forced toward the left. The water on the left side of the piston head flows out through pipe 57, through valve 56, pipe 62 into the waste tank 59. When the piston head 25 has been forced to the extreme position the ram 2 has been moved out of the mud cylinder 1. The cylinder 1 can therefore be refilled with the mix. When this has been done the valve 56 is thrown into the former position. If it should happen that the ram 2 has forced all of the mix through the die just at the time the valve 37 is thrown to the right by the trip 35, pressure can be admitted to the right hand side of piston 25 as before, through the by-pass valve 63. The by-pass valve 63 would be maintained closed except when the condition just cited happens to exist. It will be apparent that it will be seldom necessary to use the by-pass arrangement.

If desired the valves 64 and 65 can be closed and by-pass valve 66 controlled by the operator to maintain a certain pressure in the cylinder 4, in accordance with the pressure indicated by gage 67, or by gage 68. The operator could manipulate the valve 66 so as to keep the pressure in cylinder 26 constant in accordance with gage 68, or he could maintain a constantly decreasing pressure in either cylinder 26 or cylinder 4 by observing the pressure indicated by the proper gage and moving the valve accordingly.

While I have shown the mold illustrated in Figs. 1 and 2 as being the one used in the arrangement illustrated in Fig. 8, it is of course apparent that I can use the arrangement shown in Figs. 5 and 6 also in connection with the arrangement of Fig. 8, if the cylinder 1 is lowered by hydraulic pressure to admit of the compressed body being forced out as shown in Fig. 6. To do this the ram head 2 may be removed from the mud cylinder just before the latter is lowered.

The water or other fluid in the waste tank 59 can be used over again by the hydraulic pumps that supply the high and low pressure in the arrangement. These hydraulic pumps form no part of my invention and hence have not been described or shown.

My invention as previously described is applicable for forming any body from any plastic material such as oodies formed from clay; electrodes formed from carbon mixes, and many other things too numerous to mention.

Having described my invention what I claim is:

1. The method of forming bodies from plastic materials which consist in using a pressure to force the materials through a die against a less pressure uniformly exerted on the material.

2. The method of forming bodies from plastic materials which consists in forcing the material through a die by a pressure exerted thereon and resisting the movement by a less pressure exerted on the end surface of the mix coming through the restricted opening.

3. The method of forming bodies from plastic material which consists in applying pressure to force the material through a die against a resultant pressure of constant value.

4. The method of forming bodies from plastic material which consists in applying a pressure to force the material into a mold and simultaneously applying a gradually decreasing pressure to oppose the movement of the material in the mold.

5. The method of forming bodies from plastic material which consists in applying a pressure to force the material through a die and simultaneously exerting a gradually decreasing pressure to oppose the movement of the material through the opening.

In testimony whereof I have hereunto signed my name.

JOHN W. BROWN.

Witnesses:
F. D. LAWRENCE,
L. L. POTTER.